(12) United States Patent
Yamada et al.

(10) Patent No.: US 9,630,483 B2
(45) Date of Patent: Apr. 25, 2017

(54) BATTERY UNIT HOLDING DEVICE FOR VEHICLE

(71) Applicant: KABUSHIKI KAISHA TOYOTA JIDOSHOKKI, Kariya-shi, Aichi-ken (JP)

(72) Inventors: Satoshi Yamada, Aichi-ken (JP); Hiroshi Kuno, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 14/557,790

(22) Filed: Dec. 2, 2014

(65) Prior Publication Data

US 2015/0151624 A1  Jun. 4, 2015

(30) Foreign Application Priority Data

Dec. 4, 2013 (JP) ................................. 2013-251227

(51) Int. Cl.
*B60K 1/04* (2006.01)

(52) U.S. Cl.
CPC ........ *B60K 1/04* (2013.01); *B60K 2001/0438* (2013.01); *B60K 2001/0472* (2013.01); *B60Y 2306/01* (2013.01)

(58) Field of Classification Search
CPC .............. B60K 1/04; B60K 2001/0438; B60K 2001/0472; H01M 2/1083; H01M 2220/20; E05B 15/02; E05B 2015/023
See application file for complete search history.

(56) References Cited

U.S. PATENT DOCUMENTS 1,661,779 A * 3/1928 Ward et al. .................. 180/68.5
1,690,408 A * 11/1928 Hasenflue ............... E05C 19/08
29/437

(Continued)

FOREIGN PATENT DOCUMENTS

CN       202006771 U    10/2011
CN       102802982 A    11/2012

(Continued)

OTHER PUBLICATIONS

Communication dated Apr. 2, 2015 from the European Patent Office in counterpart Application No. 14195338.0.

(Continued)

*Primary Examiner* — J. Allen Shriver, II
*Assistant Examiner* — Steve Clemmons
(74) *Attorney, Agent, or Firm* — Sughrue Mion, PLLC (57) ABSTRACT

A battery unit holding device that holds a battery unit in place includes a fixing part, a fixed part, and a positioning part provided between the vehicle body and the battery unit for positioning the battery unit on the vehicle body. The fixed part has a support shaft extending in a first direction that corresponds to one of a longitudinal direction and a width direction of the vehicle body and supports the load acting downwardly on the battery unit. The fixing part is movable along the support shaft while holding the support shaft at a middle position thereof. When a first impact greater than a first preset force is applied to the vehicle body in the first direction, the positioning part permits the fixing part to move in the first direction along the support shaft from the middle position of the support shaft.

4 Claims, 9 Drawing Sheets

(56) References Cited

U.S. PATENT DOCUMENTS

| | | | | |
|---|---|---|---|---|
| 4,087,895 | A | * | 5/1978 | Etienne .......................... 29/252 |
| 4,756,565 | A | * | 7/1988 | Myslicki et al. ............. 292/340 |
| 4,946,208 | A | * | 8/1990 | Myslicki et al. ............. 292/216 |
| 5,555,950 | A | * | 9/1996 | Harada ............... H01M 2/1083 180/232 |
| 6,000,737 | A | * | 12/1999 | Yiu ....................... E05B 85/045 292/340 |
| 7,222,893 | B2 | * | 5/2007 | Miyake et al. .......... 292/341.18 |
| 8,006,793 | B2 | * | 8/2011 | Heichal et al. .............. 180/68.5 |
| 8,453,778 | B2 | * | 6/2013 | Bannier et al. ............. 180/68.5 |
| 2010/0001553 | A1 | * | 1/2010 | Yoda ........................ 296/193.07 |
| 2011/0012376 | A1 | * | 1/2011 | Hunt et al. ................... 292/216 |
| 2012/0111654 | A1 | * | 5/2012 | Origuchi ..................... 180/68.5 |
| 2013/0075173 | A1 | * | 3/2013 | Kato et al. .................. 180/68.5 |
| 2014/0165354 | A1 | | 6/2014 | Ojima et al. |

FOREIGN PATENT DOCUMENTS

| | | | | |
|---|---|---|---|---|
| DE | 102010050826 A1 | | 5/2012 | |
| FR | 2880476 A1 | * | 7/2006 | |
| FR | 2943970 A3 | * | 10/2010 | ............... B60K 1/04 |
| FR | 2946593 A1 | | 12/2010 | |
| FR | 2979078 A1 | * | 2/2013 | ............... B60K 1/04 |
| JP | 2006-182099 A | | 7/2006 | |
| JP | 2006182099 A | * | 7/2006 | |
| JP | 2010100207 A | | 5/2010 | |
| JP | 2010184621 A | * | 8/2010 | |
| JP | 2011129411 A | * | 6/2011 | |
| JP | 2011129412 A | * | 6/2011 | |
| JP | 2011131790 A | * | 7/2011 | |
| JP | 2013-067334 A | | 4/2013 | |
| WO | WO 2012052511 A1 | * | 4/2012 | |
| WO | 2012176619 A1 | | 12/2012 | |

OTHER PUBLICATIONS

Communication dated Jul. 27, 2016, from the State Intellectual Property Office of People's Republic of China in counterpart application No. 201410725824.5.

* cited by examiner

BATTERY UNIT HOLDING DEVICE FOR VEHICLE

BACKGROUND OF THE INVENTION

The present invention relates to a battery unit holding device for a vehicle.

A battery unit holding device for a vehicle is disclosed in Japanese Unexamined Patent Application Publication No. 2013-67334 . The battery unit holding unit has a deformable bracket between the vehicle body and the battery unit. The deformable bracket supports the load acting downwardly on the battery unit between the vehicle body and the battery unit. If an impact is applied to the vehicle in its width direction, the vehicle body may be deformed or crushed in the width direction by the impact, and an inertial force corresponding to the impact may act on the battery unit. When an impact whose magnitude is greater than a specified magnitude is applied to the vehicle in the vehicle width direction, the bracket is deformed thereby to permit the battery unit to move or to be displaced in the width direction of the battery unit relative to the vehicle body. Therefore, in the event of application of an impact to the vehicle, the battery unit holding device suppresses damages incurred by the battery unit, while holding the battery unit in place in the lower part of the vehicle body.

Japanese Unexamined Patent Application Publication No. 2006-182099 discloses a battery unit holding device for a vehicle of a different type. The battery unit holding device has a battery frame provided in the vehicle and a bolt. The battery frame has an elongated hole extending in the vehicle width direction. The bolt is fastened to the battery unit through the elongated hole with the bolt shank inserted through the elongated hole and the bolt head pressed in contact with the periphery of the elongated hole from above. The battery frame and the bolt cooperate to support the load on the battery unit acting downwardly between the vehicle body and the battery unit. The bolt is displaceable in the width direction within the elongated hole when an impact whose magnitude is greater than a specified magnitude is applied to the vehicle in its width direction, thereby permitting the battery unit to move in the width direction of the battery unit relative to the vehicle. Thus, the battery unit holding device according to this Publication also suppresses damages incurred by the battery unit, while holding the battery unit in place in the lower part of the vehicle body.

However, the battery unit holding devices disclosed in the above-cited Publications tend to become heavy in weight and to involve a high cost.

To be more specific, in the case of the battery unit holding device disclosed in Japanese Unexamined Patent Application Publication No. 2013-67334, making the deformable bracket strong enough to adequately support the load on the battery unit may involve an increase in the weight and the material cost of the battery unit holding device. Furthermore, designing and manufacturing of the bracket so as to be deformable without fail upon receiving an impact may also involve an increase in the manufacturing cost.

In the case of the battery unit holding device disclosed in Japanese Unexamined Patent Application Publication No. 2006-182099, on the other hand, making part of the battery frame around the elongated hole and the bolt strong enough to adequately support the load on the battery unit may also involve an increase in the weight and the material cost of the battery unit holding device. Designing a bolt having the fastening strength falling within the desired range requires a precise control of the fastening torque of the bolt, which may lead to an increase in the cost of tightening torque management.

The present invention which has been made in view of the above circumstances, is directed to providing a battery unit holding device for a vehicle that is practical in use, light in weight, and low in manufacturing cost.

SUMMARY OF THE INVENTION

In accordance with an aspect of the present invention, there is provided a battery unit holding device for a vehicle that holds a battery unit in place in a lower part of a body of the vehicle and includes a fixing part that is provided in one of the vehicle body and the battery unit, a fixed part that is provided in the other of the vehicle body and the battery unit and to be fixed on the fixing part, and a positioning part that is to be provided between the vehicle body and the battery unit for positioning the battery unit to the vehicle body. The fixed part includes a support shaft that extends in a first direction that corresponds to one of a longitudinal direction and a width direction of the vehicle body for supporting load acting downwardly on the battery unit. The fixing part is movable in the first direction along the support shaft while holding the support shaft at a middle position of the support shaft. The positioning part is configured to permit the fixing part to move in the first direction along the support shaft from the middle position of the support shaft when a first impact that is greater than a first preset force is applied to the vehicle body in the first direction.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the embodiments together with the accompanying drawings in which.

DETAILED DESCRIPTION OF THE EMBODIMENTS

The following will describe the first to third embodiments of the present invention with reference to the drawings.

First Embodiment

Figure 1:
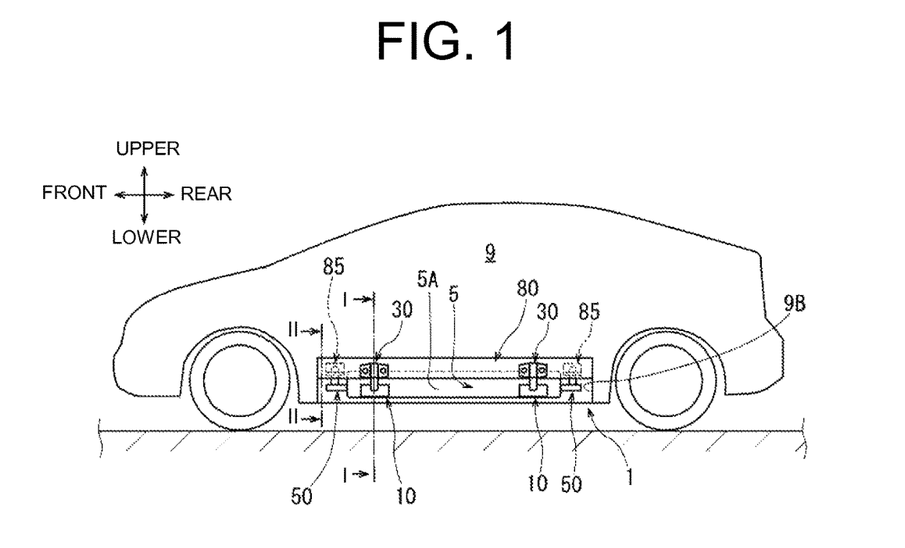
FIG. 1 is a schematic view of a vehicle on which a battery unit holding device according to a first embodiment of the present invention is mounted.
Figure 2:
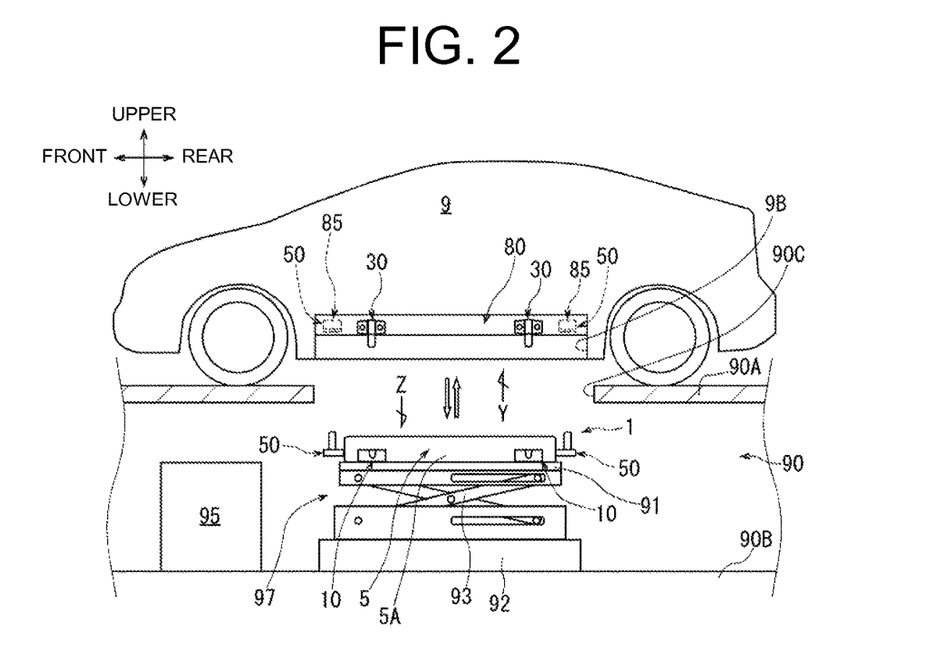
FIG. 2 is a schematic view of the battery unit holding device of FIG. 1, showing a state in which the battery unit is removed from the vehicle.

The first embodiment of the present invention will now be described with reference to FIGS. 1 and 2. Referring to the drawings, numeral 1 designates a battery unit holding device that is adapted to removably hold a battery unit 5 in a lower part of a vehicle body 9 of an electric vehicle. The battery unit holding device 1 is an example which embodies the battery unit holding device of the present invention. In FIGS. 1 and 2, the double-headed arrows with indications UP and DOWN and FRONT and REAR represent the vertical direction and the longitudinal direction of the vehicle body 9, respectively. Although not shown in FIGS. 1 and 2, the direction that is perpendicular to the longitudinal direction is the width direction of the vehicle body 9. Such width direction is shown by double-headed arrows with indications RIGHT and LEFT appearing, for example, in FIGS. 3 and 4. That is, the indications by arrows show the orientation of parts and components used in the battery unit holding device.

As shown in FIG. 2, the battery unit 5 may be mounted to and removed from the vehicle body 9 of the electric vehicle at a battery mounting station 90. The battery mounting station 90 has an upper floor 90A and a lower floor 90B. The electric vehicle may be disposed on the upper floor 90A. An access hole 90C that is open in the vertical direction is provided in the upper floor 90A. A transfer device 97 is disposed on the lower floor 90B. The transfer device 97 is located right below the access hole 90C.

Figure 3:
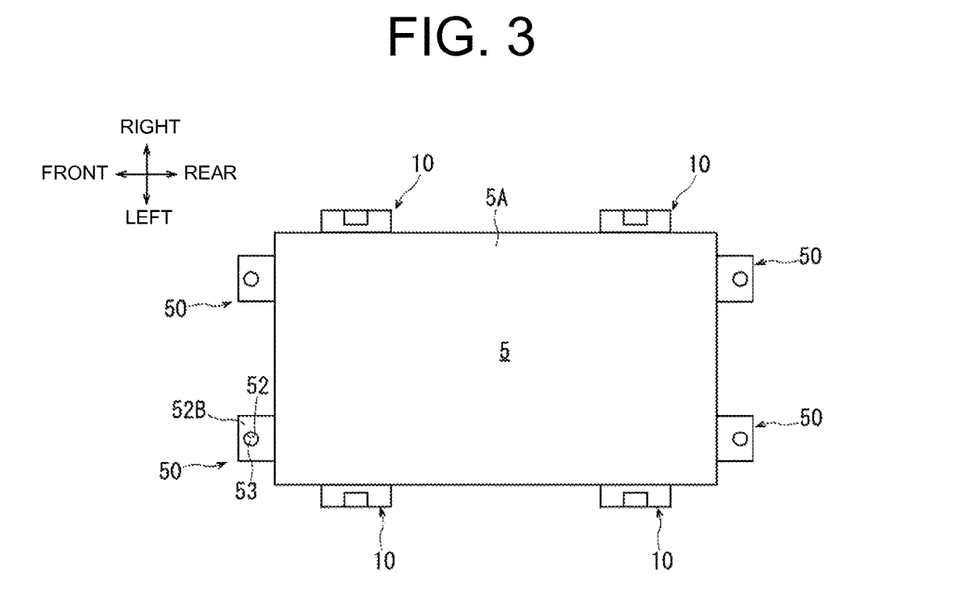
FIG. 3 is a top view of the battery unit as viewed in the arrow direction Z in FIG. 2.

As shown in FIGS. 2 and 3, the battery unit 5 includes a box-shaped casing 5A and a plurality of battery cells (not shown) stored in the casing 5A. The casing 5A has connection terminals (not shown) for electrical connection with power lines (not shown) and the battery cells.

Figure 4:
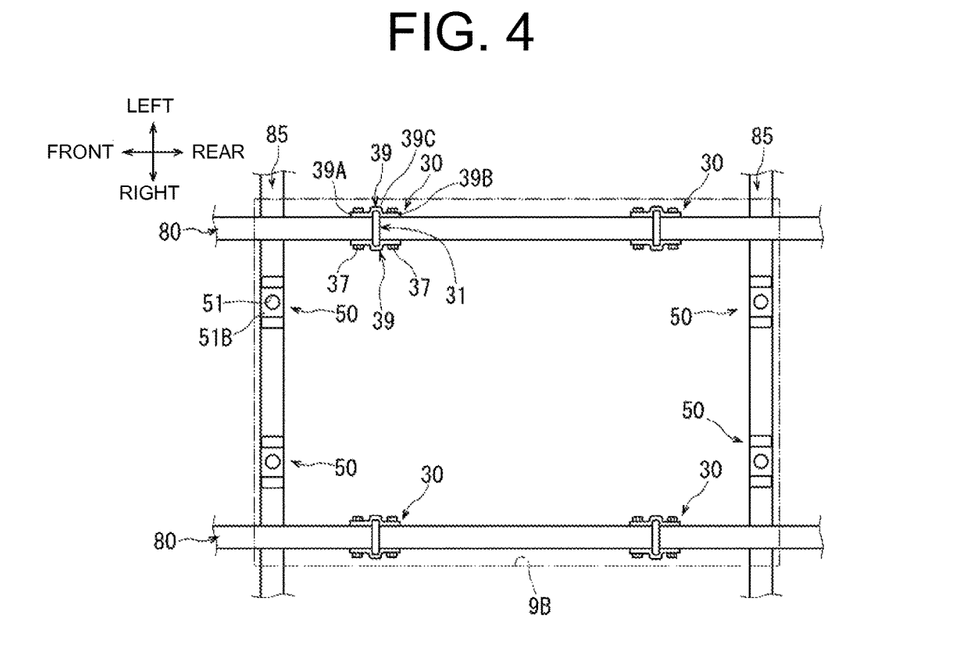
FIG. 4 is a bottom view of a frame member and other components of the vehicle body as viewed in the arrow direction Y in FIG. 2.

As shown in FIGS. 1, 2 and 4, the vehicle body 9 has in the lower part thereof a mounting space 9B in which the battery unit 5 is stored. It is to be noted that, although the casing 5A is shown in a simplified form in the drawings, the shape of the casing 5A may be appropriately modified according to the shape of the mounting space 9B. A pair of right and left side members 80, 80 and a pair of front and rear reinforcing frames 85, 85 are provided in the vehicle body 9.

The side members 80, 80 extend in the longitudinal direction of the vehicle body 9 and are disposed on the right and left sides, respectively, of the lower part of the vehicle body 9. The reinforcing frames 85, 85 extend in the right and left direction, i.e., in the width direction of the vehicle body 9 so as to intersect with the side members 80, 80. As shown in FIG. 4, the side members 80, 80 are arranged extending along the respective right and left edges of the mounting space 9B and the reinforcing frames 85, 85 are arranged so as to extend along the respective front and rear edges of the mounting space 9B. As shown in FIG. 2, the side members 80, 80 and the reinforcing frames 85, 85 are disposed so as to face the mounting space 9B from above.

Referring to FIGS. 1 to 7, the battery unit holding device 1 includes four lock devices 10, four striker devices 30, and four positioning parts 50. The lock device 10 is an example of the fixing part of the present invention. The striker device 30 is an example of the fixed part of the present invention.

As shown in FIG. 3, the respective lock devices 10 are disposed at the front right, the front left, the rear right, and the rear left of the battery unit 5. The lock devices 10 disposed on the right and left sides of the battery unit 5 are of substantially the same configuration, but arranged only with a reversal of right and left. Therefore, the following description will focus on the lock devices 10 on the front left side of the battery unit 5 that is shown in FIGS. 5, 7, 8, 9 and 11, and the description and illustration of the other lock devices 10 will be omitted or simplified appropriately.

As shown in FIG. 4, the respective striker devices 30 are disposed at the front and rear of the respective right and left side members 80 and of the substantially the same configuration. Therefore, the following description will focus on the striker device disposed at the front of the left side member 80 that is shown in FIGS. 5, 7, 8, 10 and 11, and the description and illustration of the remaining striker devices 30 will be omitted or simplified appropriately.

Figure 6:
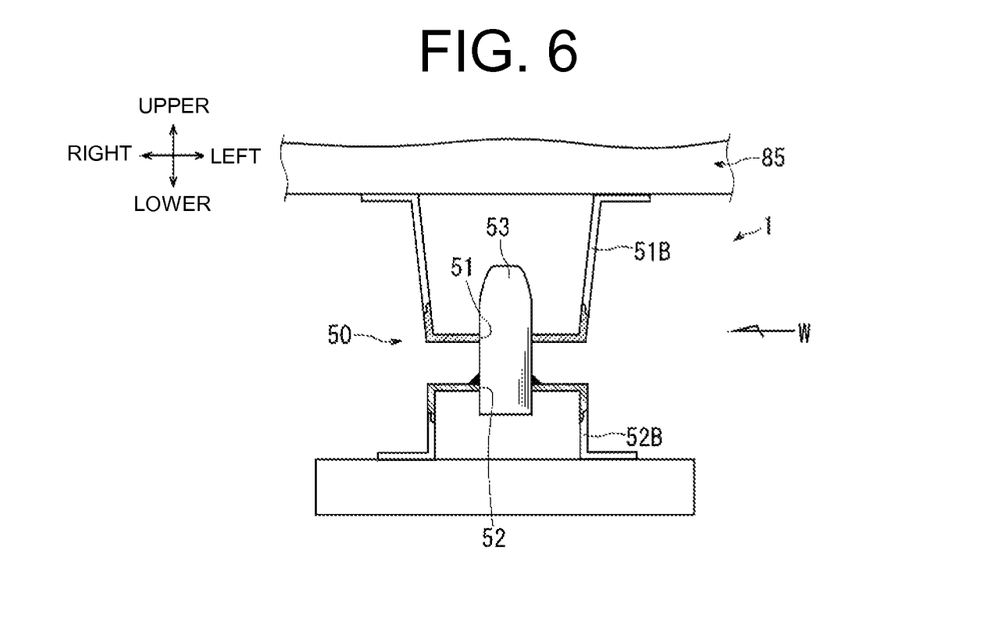
FIG. 6 is a partial cross-sectional view taken along line II-II in FIG. 1, showing a positioning part of the battery unit holding device.
Figure 9:
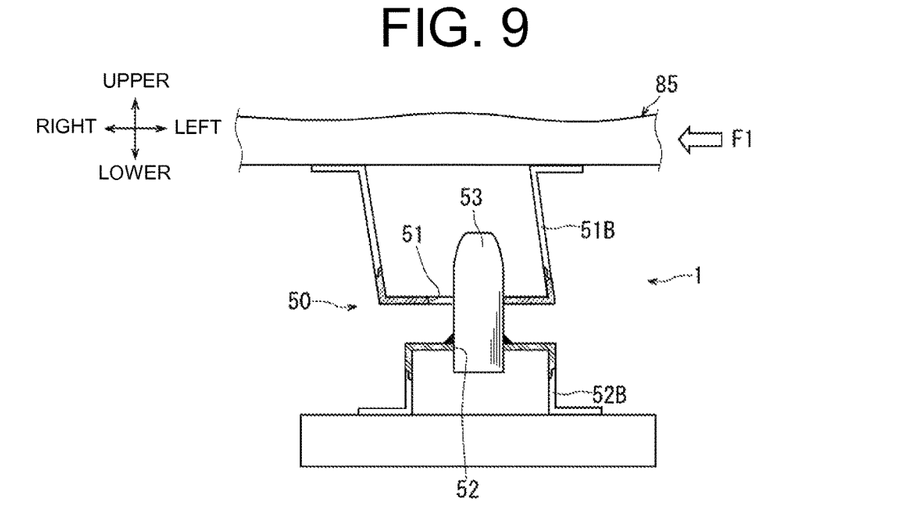
FIG. 9 is a partial cross-sectional view taken along line II-II in FIG. 1 similar to FIG. 6, explaining the operation of the positioning part when a first impact is greater than a first preset force.

As shown in FIGS. 1 to 4, two of the positioning parts 50 are disposed at right and left positions of and between the front part of the battery unit 5 and the front reinforcing frame 85, and the remaining two positioning parts 50 are disposed at right and left positions of and between the rear part of the battery unit 5 and the rear reinforcing frame 85. In short, the positioning parts 50 in FIG. 1 are disposed between the vehicle body 9 and the battery unit 5. All the positioning parts 50 have substantially the same configuration. Therefore, the following description will focus on the positioning parts 50 disposed at right and left positions of and between the front part of the battery unit 5 of the front reinforcing frame 85 that are shown in FIGS. 6 and 9, and the description and illustration of the remaining positioning parts 50 will be omitted or simplified appropriately.

Referring to FIGS. 4, 5, 7 and 8, the striker device 30 has a pair of right and left base plates 39, 39 and a striker 31. Each base plate 39 is of a steel plate that is formed in a substantially ohm (Ω) shape in cross section and extending in the longitudinal direction of the side members 80. Specifically, the base plate 39 has a curved part 39C having a substantially semi-circular cross section in the vertical direction and flat plate parts 39A, 39B that are connected to the curved part 39C and extend in opposite frontward and rearward directions, respectively. The base plates 39, 39 of each pair are disposed on the opposite sides of the side member 80.

Figure 5:
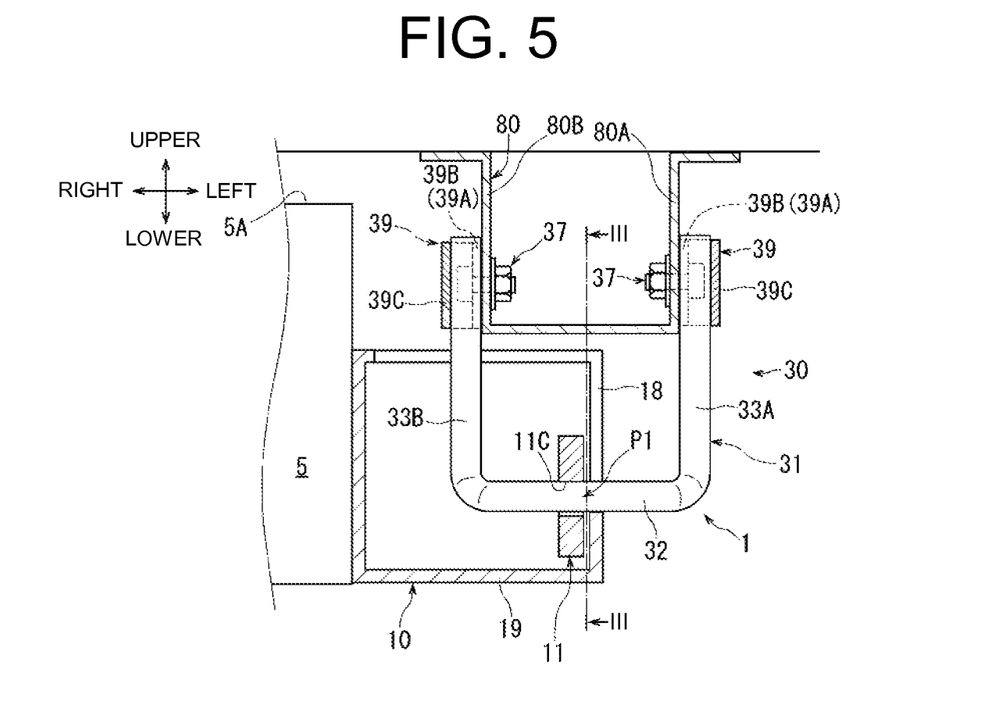
FIG. 5 is a partial cross-sectional view taken along line I-I in FIG. 1, showing a striker device and a lock device of the battery unit holding device.

The striker 31 is made of a steel projecting part that is bent in a substantially U-shape, as shown in FIG. 5. Specifically, the striker 31 includes a pair of right and left projecting parts 33A, 33B and a horizontal support shaft 32. The upper end of the left projecting part 33A of the striker 31 is inserted in the curved part 39C of the left base plate 39 and welded to the base plate 39. The upper end of the right projecting part 33B of the striker 31 is inserted in the curved part 39C of the right base plate 39 and welded to the base plate 39. The projecting parts 33A, 33B extending straight downward are connected to each other at the lower ends thereof by the support shaft 32 extending in the right and left direction.

Figure 7:
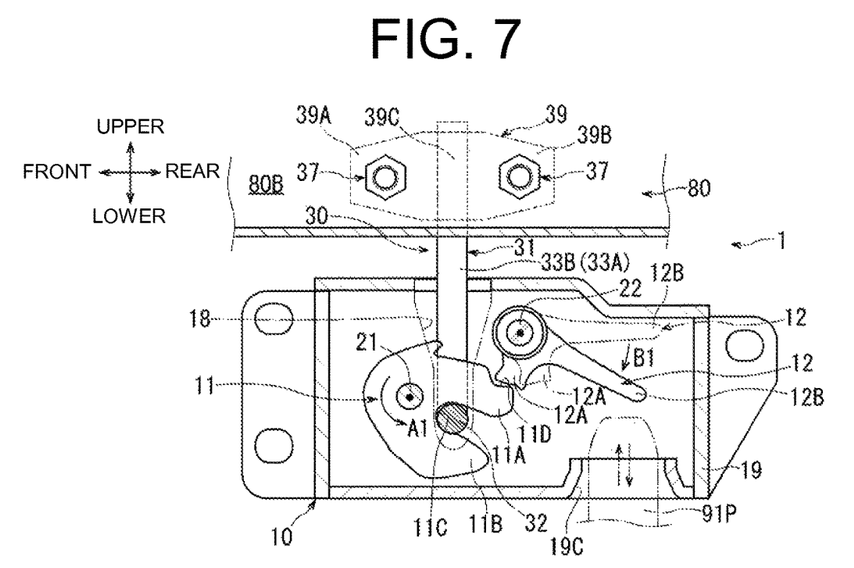
FIG. 7 is a partial cross-sectional view taken along line III-III in FIG. 5, showing a state in which a support shaft of the striker device is fixed by the lock device.

As shown in FIGS. 5 and 7, the left base plate 39 is fixedly mounted to the left frame side wall 80A of the side member 80 with flat plate parts 39A, 39B in contact with the side wall 80A. Similarly, the right base plate 39 is fixedly mounted to the right frame side wall 80A of the side member 80 with flat plate parts 39A, 39B in contact with the side wall 80A. Fastening members 37 including bolts and nuts are tightened to fix the base plates 39, 39 to the frame side walls 80A, 80B of the side member 80, respectively. As a result, the base plates 39, 39 are fixed to the side member 80 with the striker 31 extending downwardly. In this state, the support shaft 32 of the striker 31 extends in the in the width direction at a position spaced below from the side member 80. The support shaft 32 fixed to the lock device 10 thereby to support the load acting downwardly on the battery unit 5.

Figure 8:
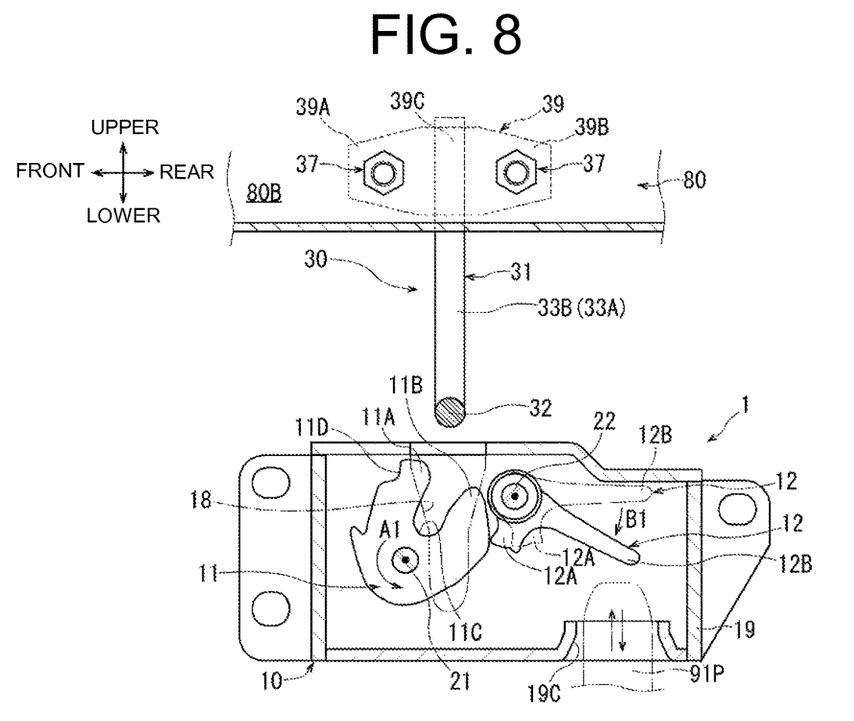
FIG. 8 is a partial cross-sectional view showing a state in which the support shaft of the striker device is released from the lock device.

Referring to FIGS. 5, 7 and 8, the lock device 10 includes a housing 19, a latch 11, and a pawl 12.

The housing 19 is fixed at a position on the side of the casing 5A of the battery unit 5 adjacent to the front thereof and has an insertion hole 18 formed through the upper part of the housing 19. As indicated by phantom line in FIGS. 7 and 8, the insertion hole 18 extends downwardly into the housing 19. When the battery unit 5 is moved to be mounted to the vehicle body 9, the support shaft 32 of the striker 31 is inserted in the insertion hole 18 in the housing 19.

As shown in FIGS. 7 and 8, a latch shaft 21 and a pawl shaft 22 are provided in the housing 19. The latch shaft 21 and the pawl shaft 22 extend in the right and left direction in the housing 19.

The housing 19 has an insertion bore 19C formed through the bottom of the housing 19. When the battery unit 5 is mounted to or removed from the vehicle body 9, a pin 91P shown in FIGS. 7 and 8 passes through the insertion bore 19C and enters the housing 19. Although not shown in the drawing, the pin 91P is mounted on the upper surface of a bench 91 (FIG. 2) and movable vertically by a solenoid.

As shown in FIGS. 7 and 8, the latch 11 is formed in a U-shape in cross section having a recess 11C. The latch 11 has a pair of upper and lower jaws 11A, 11B formed on the opposite sides of the recess 11C. The recess 11C is adapted to receive the support shaft 32 of the striker 31 that is inserted in the insertion hole 18 in the housing 19. A mating face 11D is formed on the side of the upper jaw 11A that is opposite to the recess 11C.

The latch 11 is fixedly mounted on the latch shaft 21 for swinging therewith. The latch 11 is urged by a coil spring (not shown) in the arrow direction A1. The latch 11 is swingable from the position shown in FIG. 8 in the direction opposite to the direction A1 to the position shown in FIG. 7, thereby to hold the support shaft 32 in the insertion hole 18. The latch 11 is thus swingable about the latch shaft 21 and switchable between the engaging state in which the latch 11 engages with the support shaft 32 of the striker 31 and the release state in which the latch 11 releases the support shaft 32.

As shown in FIGS. 7 and 8, the pawl 12 has an engaging part 12A and an operating part 12B that extend from the pawl shaft 22 at substantially right angle to each other, thus exhibiting a substantially L-shape. The pawl 12 is fixedly mounted on the pawl shaft 22 for rotation therewith. The pawl 12 is urged by a coil spring (not shown) in the arrow direction B1.

When the battery unit 5 is mounted to or removed from the vehicle body 9, the pin 91P pushes up the operating part 12B of the pawl 12 shown by the solid line in FIG. 7 to cause the pawl 12 to rotate in the direction opposite to B1. As a result, the pawl 12 is displaced to a position indicated by the double-dot chain line in FIG. 7. When the pin 91P in turn moves down to the position at which the pin 91P is located clear of the operating part 12B, the pawl 12 returns by the urging force of the spring (not shown) to the original position shown by the solid line in FIG. 7.

The movement of the pawl 12 to the position shown by the solid line in FIG. 7 causes the engaging part 12A to move to a position at which the engaging part 12A engages with the mating face 11D of the latch 11, that is, a position at which the swinging motion of the latch 11 is prevented. On the other hand, when the pawl 12 rotates from the position shown by the solid line in FIG. 7 in the direction opposite to the direction B1 to the position shown by the double-dot chain line in FIG. 7, the engaging part 12A is caused to move to a position away from the mating face 11D of the latch 11, that is, a position at which the swinging motion of the latch 11 is permitted. As a result, the rotating motion of the pawl 12 about the pawl shaft 22 fixes or releases the swinging motion of the latch 11.

As shown in FIG. 7, the latch 11 is in the engaging state in which the latch 11 engages with the support shaft 32 in the housing 19 and the pawl 12 shown by the solid line in FIG. 7 is at such a position as to fix the swinging motion of the latch 11. In the state of FIG. 7, the support shaft 32 is located within the recess 11C in the insertion hole 18. As shown in FIG. 5, the support shaft 32 is held by the latch 11 in the recess 11C at a middle position indicated by P1 of the support shaft 32 in the right and left direction.

Figure 10:
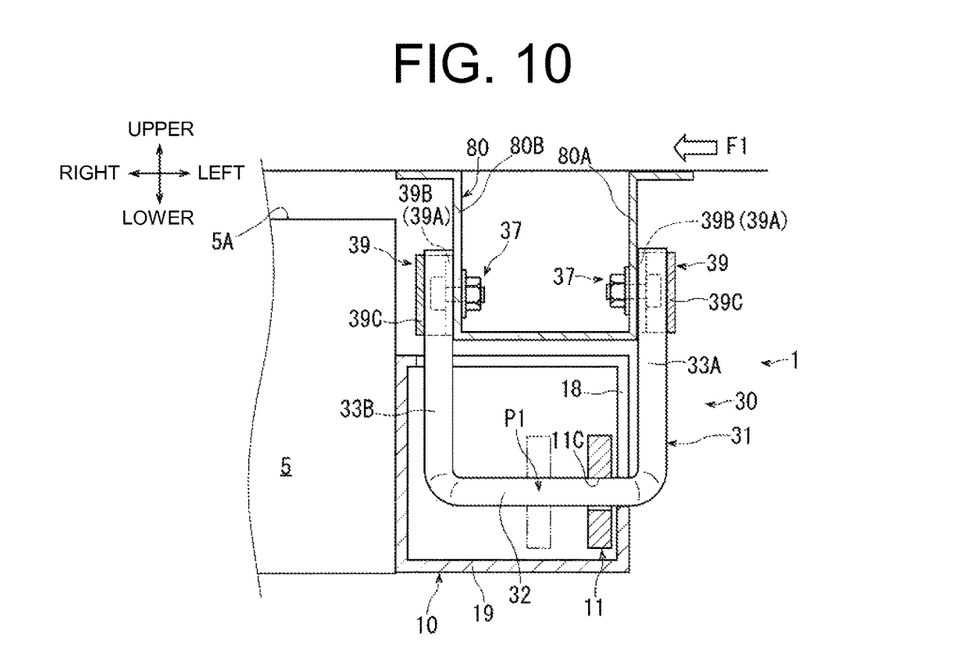
FIG. 10 is a partial cross-sectional view taken along line I-I in FIG. 1 similar to FIG. 5, explaining the operation of the striker device and the lock device when the first impact is greater than the first preset force.

The support shaft 32 is circular in cross section and formed smooth, having no irregularities on the outer peripheral surface thereof. Therefore, the support shaft 32 does not restrict the movement of the lock device 10 in the right and left direction along support shaft 32 from the middle position P1. Specifically, the lock device 10 holds the support shaft 32 at the middle position P1 thereof, while permitting the support shaft 32 to move in the width direction of the vehicle body 9 along the support shaft 32, i.e., in the right and left direction. FIG. 10 shows a state in which the lock device 10 has been moved leftward from the middle position P1 along the support shaft 32. FIG.

Figure 11:
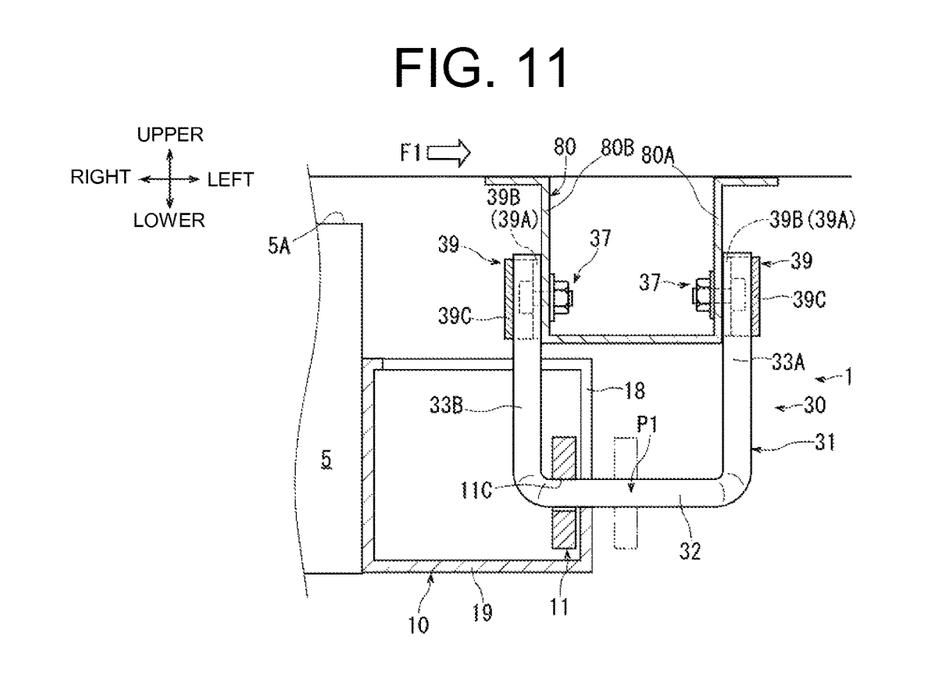
FIG. 11 is a fragmentary cross-sectional view taken along line I-I in FIG. 1 similar to FIG. 5, explaining the operation of the striker device and the lock device when the first impact acting in the direction opposite to the direction in FIG. 10 is greater than the first preset force.

11 shows a state in which the lock device 10 has been moved rightward from the middle position P1 along the support shaft 32.

Referring to FIGS. 3, 4 and 6, the positioning part 50 includes a first bracket 51B, a second bracket 52B and a positioning pin 53. A first positioning hole 51 is formed through the lower part of the first bracket 51B and a second positioning hole 52 is formed through the upper part of the second bracket 52B.

Referring to FIGS. 4 and 6, the first bracket 51B is made of a bent steel plate and fixed to the bottom surface of the front reinforcing frame 51 at a position adjacent to the left side member 80. The first positioning hole 51 is a round hole which is formed vertically through the first bracket 51B.

Referring to FIGS. 3 and 6, the second bracket 52B is also a bent steel plate and fixed to the front surface of the casing 5A at a position adjacent to the left side of the battery unit 5. The second positioning hole 52 is a round hole which is formed vertically through the second bracket 52B.

As shown in FIG. 6, the positioning pin 53 is made of a steel, and extends in the vertical direction. The lower end of the positioning pin 53 is fixedly inserted in the second positioning hole 52. Specifically, the lower end of the positioning pin 53 and the peripheral edge of the second positioning hole 52 are welded together to fix the positioning pin 53 to the second bracket 52B.

The upper end of the positioning pin 53 is tapered. In mounting the battery unit 5 to the vehicle body 9, the positioning pin 53 is inserted into the first positioning hole 51 prior to fixing of the striker device 30 by the lock device 10. When the middle part of the positioning pin 53 is inserted into the first positioning hole 51 securely without free play, the positioning part 50 fixes the position of the battery unit 5 relative to the vehicle body 9.

If the vehicle body 9 receives a lateral force due to a collision, a first impact F1 acting in the arrow direction as shown in FIG. 9 is applied to the vehicle body 9. In the present embodiment, the positioning part 50 is configured such that the first positioning hole 51 is deformed in the right and left direction or broken when the first impact F1 applied to the vehicle body 9 is greater than a first preset force G1. FIG. 9 shows the first impact F1 acting on the vehicle body 9 from the left side. The positioning hole 51 is also deformable in the opposite direction or leftward or broken when the first impact F1 is applied to the vehicle body 9 leftward.

The magnitude of the first preset force G1 may appropriately be established according to the results of an experiment such as acceleration measurement in a collision test or modifications in prototyping.

Deformation of the first positioning hole 51 includes a deformation of the roundness of the hole into a hole elongated in the right and left direction and a deformation in the right and left direction of the first bracket 51B through which the first positioning hole 51 is formed.

When the first positioning hole 51 and the first bracket 51B are deformed as shown in FIG. 9, the positioning part 50 permits the casing 5A of the battery unit 5 to be displaced or moved in the right and left direction relative to the reinforcing frame 85. This corresponds to the permission by the positioning part 50 for the lock device 10 that is fixed to the casing 5A of the battery unit 5 to move in the right and left direction relative to the striker device 30 that is fixed to the vehicle body 9. In other words, if the first impact F1 that is greater than the first preset force G1 is applied to the vehicle body 9 in the right and left direction, the positioning part 50 permits the lock device 10 to move in the right and left direction from the position of FIG. 5 along the support shaft 32, as shown in FIGS. 10 and 11.

Referring to FIG. 2, the transfer device 97 includes a base 92 fixed on the lower floor 90B, the bench 91, and a hoist mechanism 93 that is provided between the base 92 and the bench 91. The hoist mechanism 93 is of a scissor type that is driven by a drive source, such as electric motor, electric linear motion cylinder and hydraulic cylinder, and moves vertically. A control device 95 is disposed adjacent to the transfer device 97. The control device 95 controls the drive source for the hoist mechanism 93 so as to raise or lower the bench 91.

The battery unit 5 is mounted to and removed from the vehicle body 9 in the following manner. The electric vehicle is disposed at a specified position on the upper floor 90A of the battery mounting station 90, as shown in FIG. 2. At this time, the position of the electric vehicle is adjusted so that the mounting space 9B is positioned immediately above the access hole 90C, that is, right above the transfer device 97. The electric vehicle of FIG. 2 has in the mounting space 9B no battery unit such as 5.

In the meantime, the battery unit 5 is disposed at a specified position on the bench 91 of the transfer device 97. The bench 91 is raised to bring the battery unit 5 close to the mounting space 9B by controlling the hoist mechanism 93 through the control device 95. By so doing, the support shaft 32 of the striker 31 is moved relative to the lock device 10 and approaches the insertion hole 18, as shown in FIG. 8, and then the support shaft 32 is inserted in the insertion hole 18 in the housing 19, as shown in FIG. 7. When the positioning pin 53 is inserted into the first positioning hole 51, as shown in FIG. 5, the positioning part 50 positions the battery unit 5 relative to the vehicle body 9.

Subsequently, when the support shaft 32 is inserted in the insertion hole 18, as shown in FIG. 7, the lower jaw 11B of the latch 11 and the support shaft 32 are brought into engagement with each other and the support shaft 32 pushes the latch 11. This causes the latch 11 to swing about the shaft 21 in the direction opposite to the direction A1 against the urging force by the coil spring. In this case, the engaging part 12A of the pawl 12 which is urged in the direction B1 by the coil spring slides in contact with the lower jaw 11B and the upper jaw 11A of the latch successively.

When the battery unit 5 is positioned in the mounting space 9B, the pawl 12 under the urging force of the coil spring rotates in the direction B1, thereby to cause the engaging part 12A to engage with the mating face 11D of the latch 11. As a result, the latch 11 is in the engaging state in which the latch 11 engages with the support shaft 32 at the middle position P1 of the support shaft 32. In other words, the lock device 10 fixes the striker device 30. The support shaft 32 supports the load of the battery unit 5 acting downwardly between the vehicle body 9 and the battery unit 5. Thus, the battery unit holding device 1 holds the battery unit 5 in the mounting space 9B. At this time, the electrical connection between the batteries in the battery unit 5 and the electric vehicle is automatically established. Controlling the hoist mechanism 93 through the control device 95 lowers the bench 91 and the electric vehicle becomes ready to move, as shown in FIG. 1.

Although not shown, in removing the battery unit 5 from the vehicle body 9, the electric vehicle on which the battery unit 5 is mounted is disposed at a specified position on the upper floor 90A of the battery mounting station 90.

Then the bench 91 is raised by controlling the hoist mechanism 93 through the control device 95 so that the bench 91 is brought into contact with the bottom surface of the battery unit 5 in the mounting space 9B. The control device 95 causes the pin 91P shown in FIG. 7 to move upward thereby to push the operating part 12B of the pawl 12 to the position shown by the double-dot chain line in FIG. 7. Accordingly, the latch 11 is freed from the pawl 12.

With the latch 11 thus freed from the pawl 12 and swingable about the shaft 21, the hoist mechanism 93 is controlled through the control device 95 so that the bench 91 is lowered. Then the latch 11 swings in the direction A1, as shown in FIG. 8, and is released from the support shaft 32 of the striker 31 and the support shaft 32 is removed out from the insertion hole 18. Specifically, the lock device 10 does not fix the striker device 30 any longer and, therefore, the battery unit holding device 1 does not hold the battery unit 5 any longer. The battery unit 5 disposed on the bench 91, which is being lowered, is removed from the vehicle body 9.

According to the battery unit holding device 1 of the present embodiment, if the vehicle receives a lateral force due to a collision and the first impact F1 is generated in the width direction of the vehicle body 9, as shown in FIG. 9, the vehicle body 9 may be deformed or crushed in the right and the left direction, or an inertial force corresponding to the first impact F1 may act on the battery unit 5.

When the magnitude of the first impact F1 is greater than the preset force G1, the round hole of the first positioning hole 51 may be deformed into an elongated hole, or the first bracket 51B having therethrough the first positioning hole 51 may be deformed in the right and left direction. In the event of such deformation, the positioning part 50 permits the lock device 10 that is fixed to the casing 5A of the battery unit 5 to move in the right and left direction relative to the striker device 30 fixed to the vehicle body 9.

The positioning part 50 permits the lock device 10 to move or to be displaced along the support shaft 32 from the middle position P1 in either direction according to the direction of the first impact F1. This absorbs the movement of the battery unit 5 in the right and left direction relative to the vehicle body 9. Therefore, the battery unit holding device 1 holds the battery unit 5 in place in the lower part of the vehicle body 9 and suppresses damage to the battery unit 5 even in the event of application of an impact against the vehicle body 9 in the width direction thereof.

In the battery unit holding device 1, the support shaft 32 of the striker device 30, which is disposed extending in the right and left direction, may be made with an increased diameter for the purpose of adequately supporting the load on the battery unit 5 without noticeably increasing the weight and cost of the battery unit holding device 1. Furthermore, for the lock device 10 to move along the support shaft 32 smoothly in the event of application of an impact to the vehicle body 9, it may be so configured that the battery unit holding device 1 may be configured such that the positioning part 50 which does not support any part of the load of the battery unit 5 permits the lock device 10 to move along the support shaft 32. Therefore, the lock device 10 and the striker device 30 need neither be designed in a complicated form nor be precisely controlled.

Thus, the battery unit holding device 1 of the first embodiment exhibits practical usefulness in that it holds the battery unit 5 in place in the lower part of the vehicle body 9 and suppresses damages to the battery unit 5 in the event of an impact against the vehicle body 9 while adequately supporting the load on the battery unit 5. Furthermore, the battery unit holding device 1 of the present embodiment is advantageously light in weight and low in manufacturing cost.

Furthermore, in the battery unit holding device 1 of the first embodiment, when the first impact F1 that is greater than the first preset force G1 is applied to the vehicle body 9 in the right and left direction, the positioning hole 51 provided to the vehicle body 9 side is deformed, thus the positioning part 50 permitting the lock device 10 to move in the right and left direction relative to the striker device 30. Therefore, in the battery unit holding device 1, the permitting operation of the positioning part 50 in the event of application of an impact is controlled easily with the positioning hole 51 of a simple form.

The battery unit holding device 1 of the first embodiment is configured such that the battery unit 5 is removably held to the vehicle body 9 by the lock device 10 and the striker device 30 having the configuration described above. The battery unit holding device 1 of the first embodiment is also configured such that the battery unit 5 is permitted to move relative to the vehicle body 9 in the event of application of an impact. Therefore, reduction in the weight and the manufacturing cost can be achieved easily.

Modifications of the Positioning Part

Figure 12:
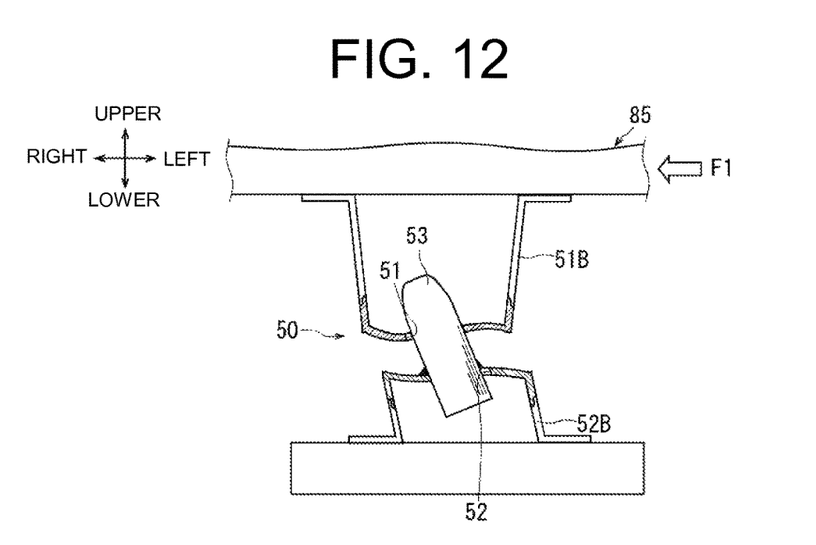
FIG. 12 is a partial cross-sectional view taken along line II-II in FIG. 1 similar to FIG. 6, showing a modification of the positioning part.

The following will describe a modification of the positioning part 50 with reference to FIG. 12. The positioning part 50 according to the modification is configured such that the first positioning hole 51 on the vehicle body 9 side and the second positioning hole 52 that supports the positioning pin 53 on the battery unit 5 side are deformed or broken when the first impact F1 that is greater than the first preset force G1 is acted on the vehicle body 9 in the right and left direction.

Figure 13:
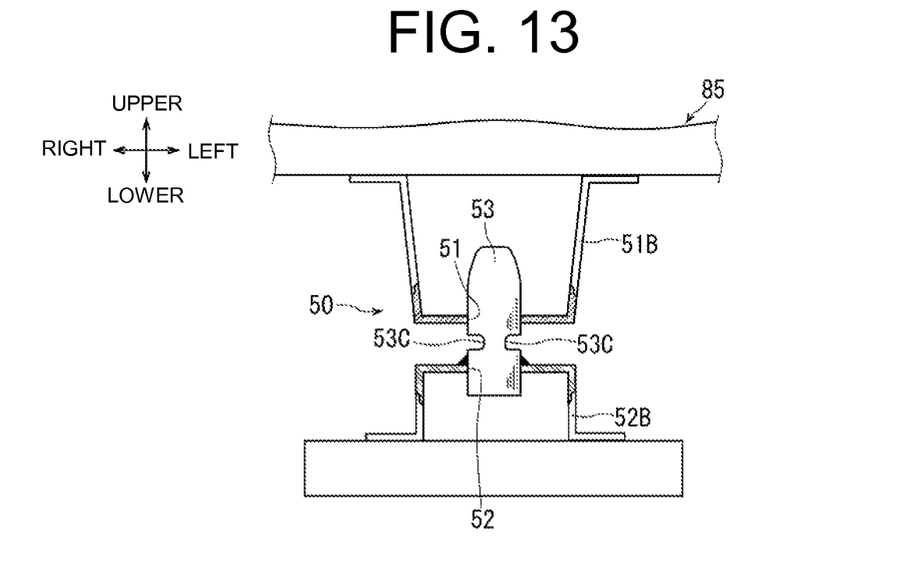
FIG. 13 is a partial cross-sectional view taken along line II-II in FIG. 1 similar to FIG. 6, explaining another modification of the positioning part.

Another modification of the positioning part 50 will be described with reference to FIG. 13. In the present modification of the positioning part 50, a pair of right and left notches 53C is formed on opposite right and left sides of the positioning pin 53 at a middle position of the positioning pin 53 as viewed in the vertical direction. The notches 53C are recessed from the outer periphery of the positioning pin 53 and have a shape of a groove. Although not shown in the drawing, the positioning pin 53 of the positioning part 50 according to the present modification is configured to be deformed or broken at the notches 53C when the first impact F1 that is greater than the first preset force G1 is applied to the vehicle body 9 in the right and left direction.

The positioning part 50 according to the above modifications also exhibits the same effects described earlier with reference to the first embodiment, when applied to the battery unit holding device 1 according to the first embodiment.

Second Embodiment

Figure 14:
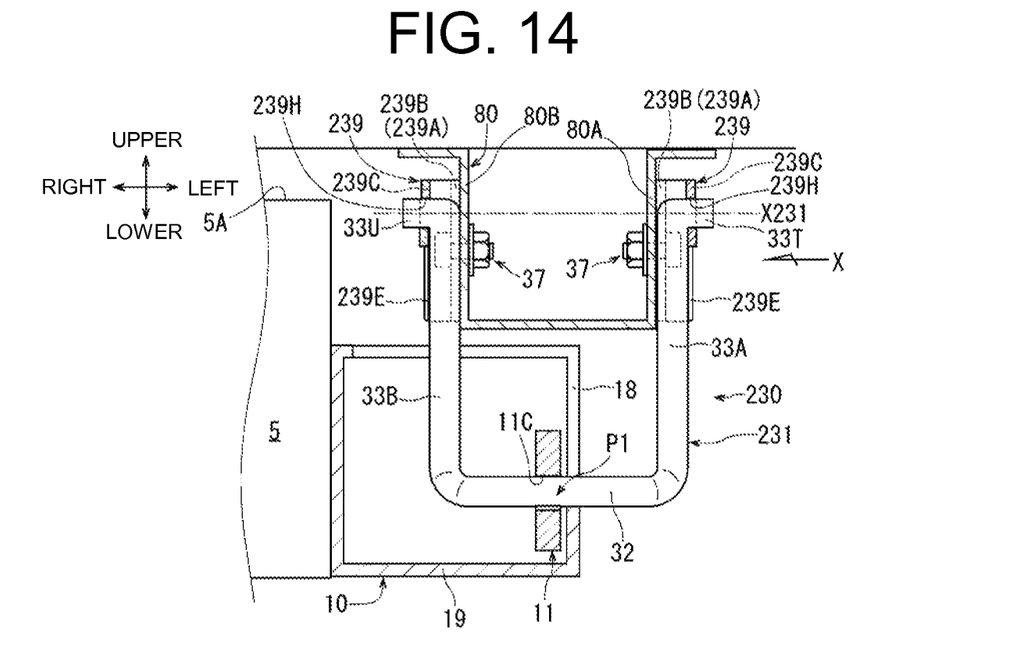
FIG. 14 is a partial cross-sectional view taken along line I-I in FIG. 1 similar to FIG. 5, showing the striker device and the lock device of the battery unit holding device for a vehicle of a second embodiment according to the present invention.
Figure 15:
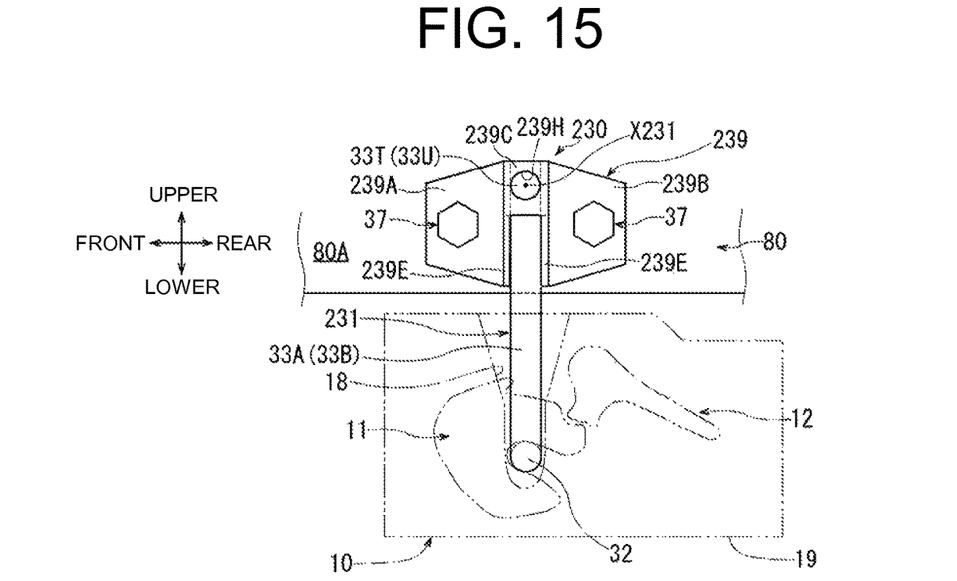
FIG. 15 is a side view showing the striker device and the lock device as viewed in the arrow direction X in FIG. 14.
Figure 16:
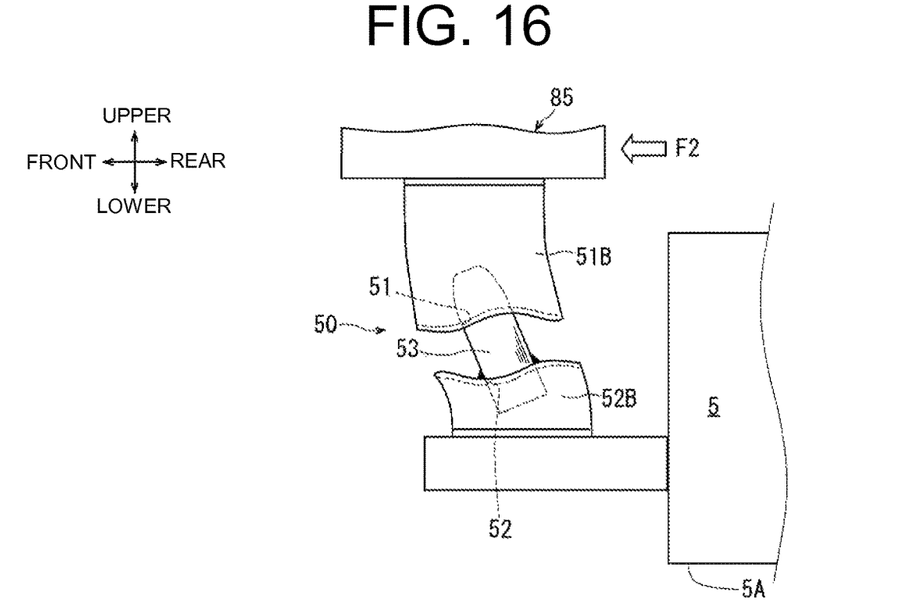
FIG. 16 is a side view of the positioning part and other components as seen in the arrow direction W in FIG. 6, explaining the operation of the positioning part when a second impact is greater than a second preset force.
Figure 17:
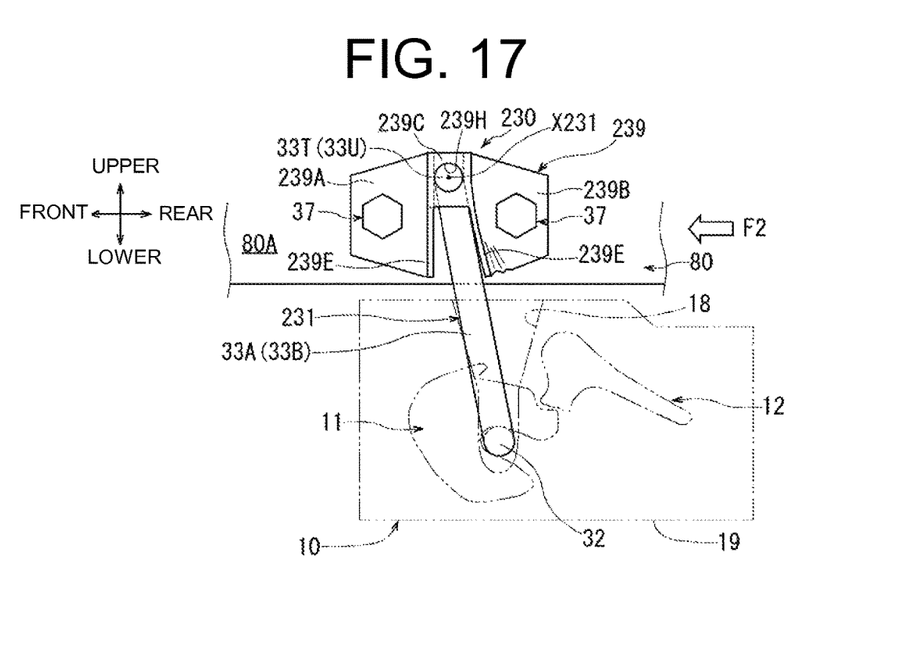
FIG. 17 is a fragmentary side view showing the striker device and the lock device as seen in the arrow direction X in FIG. 14 similar to FIG. 15, explaining the operation of the striker device and the lock device when the second impact is greater than the second preset force.

As shown in FIGS. 14, 15 and 17, the battery unit holding device according to the second embodiment differs from that of the first embodiment in that the striker device 30 of the first embodiment is substituted by the striker devices 230. As illustrated in FIG. 16, the battery unit holding device according to the second embodiment also differs from the battery unit holding device 1 according to the first embodiment in that minor changes have been made to the positioning part 50 of the second embodiment. The rest of the configuration of the battery unit holding device according to the second embodiment is substantially the same as that of the first embodiment and, therefore, the numerals and symbols used in the first embodiment will be used for the components of the second embodiment having substantially the same configuration as those of the first embodiment.

Referring to FIGS. 14 and 15, four striker devices 230 are disposed at the front and rear of the respective right and left side members 80, 80 in the same manner as in the first embodiment. Therefore, the following description will focus on the striker device 230 disposed at the front of the left side member 80 and the description and illustration of the remaining striker devices 230 will appropriately be omitted.

The striker device 230 has a pair of right and left base plates 239, 239 and a striker 231. Each base plate 239 is of a steel plate that is formed in a substantially ohm (Ω) shape in cross section in the longitudinal direction of the side member 80. Specifically, the base plate 239 has a curved part 239C having a substantially semi-circular cross section and extending in the vertical direction, a pair of right and left side walls 239E, 239E extending downwardly from the bottom edges of the respective curved part 239C, and flat plate parts 239A, 239B that are connected to the curved part 239C and extend in opposite frontward and rearward directions, respectively. Shaft holes 239H, 239H are formed through the curved part 239C. The paired base plates 239, 239 are disposed on the opposite sides of the side member 80.

The striker 231 of the second embodiment includes a pair of projecting parts 33A, 33B and a support shaft 32. The upper part of the left projecting part 33A is sandwiched at the front and rear thereof by the side walls 239E, 239E of the left base plate 239 and inserted into the curved part 239C. An upper end 33T of the left projecting part 33A is bent leftward and inserted into a shaft hole 239H. The upper part of the right projecting part 33B is sandwiched by the side walls 239E, 239E of the right base plate 239 and inserted into the curved part 239C. An upper end 33U of the right projecting part 33B is bent rightward and inserted into the shaft hole 239H.

The flat plate parts 239A, 239B of the left base plate 239 are attached to the left frame side wall 80A of the side member 80 and flat plate parts 239A, 239B of the right base plate 239 are attached to the right frame side wall 80B of the side member 80, respectively. The flat plate parts 239A, 239B of the base plates 239, 239 are fixed to the frame side walls 80A, 80B of the side member 80, respectively, by the fastening members 37 that include bolts and nuts. As a result, the striker 231 is supported swingably about an axis X231 that is substantially parallel to the right and left direction by the base plates 239, 239. The projecting parts 33A, 33B, which are sandwiched at the front and rear thereof by the side walls 239E, 239E, extend straight downwardly from the base plate 239, 239.

The base plates 239, 239 are fixed to the side members 80 with the striker 231 extending downwardly. In this state, the support shaft 32 of the striker 231 extends horizontally in the right and left direction at a position spaced below from the side member 80. The support shaft 32, which is fixed to the lock device 10, supports the load acting downwardly on the battery unit 5.

In the event that the vehicle had a collision at the front or the rear thereof, a second impact F2 is applied to the vehicle body 9 in the longitudinal direction thereof, as shown in FIG. 16. In the present embodiment, the positioning part 50 is configured such that, when the second impact F2 applied to the vehicle body 9 is greater than a second preset force G2 of a predetermined value, the first positioning hole 51 and the second positioning hole 52 are deformed or broken in the longitudinal direction. FIG. 16 shows the second impact F2 acting on the rear side the vehicle body 9. When the second impact F2 is applied to the vehicle body 9 from the front side to the rear, the first positioning hole 51 and the second positioning hole 52 are deformed in the direction opposite to the direction shown in FIG. 16.

As in the case of the first preset force G1 described with reference to the first embodiment, the magnitude of the second preset force G2 may also appropriately be established according to the results of an experiment such as acceleration measurement in a collision test or modifications in prototyping. It is to be noted that the longitudinal direction of the vehicle body 9 is an example of the second direction in the present invention.

Deformation of the first positioning hole 51 and the second positioning hole 52 includes, for example, deformation of the first positioning hole 51 and the second positioning hole 52 into an elongated hole extending in the longitudinal direction and deformation of the first and second brackets 51B, 52B having therein the first and second positioning holes 51, 52, respectively, by displacement thereof in the longitudinal direction.

The positioning part 50 permits the casing 5A of the battery unit 5 to move or to be displaced in the longitudinal direction relative to the reinforcing frame 85 and the side member 80.

By virtue of the permitting operation of the positioning part 50, the side walls 239E, 239E are pushed by the projecting parts 33A, 33B and easily deformed plastically, as shown in FIG. 17, which causes the striker 231 to swing about the axis X231 and the support shaft 32 to move frontward or rearward. In other words, when the second impact F2 that is greater than the second preset force G2 is applied to the vehicle body 9, the positioning part 50 permits the striker 231 to swing about the axis X231, thus permitting the support shaft 32 to move frontward or rearward.

The battery unit holding device according to the second embodiment has substantially the same effects as the battery unit holding device 1 according to the first embodiment.

In the battery unit holding device according to the second embodiment, if the vehicle body receives the second impact F2 in the longitudinal direction due to a collision at the front or the rear of the vehicle, the vehicle body 9 may be deformed or crushed in the right and left direction by the second impact F2, or an inertial force corresponding to the second impact F2 may act on the battery unit 5.

In this case, when the second impact F2 is greater than the preset force G2, the round holes of the first positioning hole 51 and the second positioning hole 52 may be deformed into an elongated hole, or the first and second brackets 51B, 52B having the first positioning hole 51 and the second positioning hole 52, respectively may be deformed in the longitudinal direction. In the event of such deformation, the positioning part 50 permits the lock device 10 that is fixed to the casing 5A of the battery unit 5 to move in the longitudinal direction relative to the side members 80 of the vehicle body 9.

By virtue of such permitting operation of the positioning part 50, the side walls 239E, 239E are pushed by the projecting parts 33A, 33B and plastically deformed, which causes the striker 231 to swing about the axis X231 and the support shaft 32 to move frontward or rearward. The lock device 10 holding the support shaft 32 also moves frontward or rearward together with the support shaft 32. As a result, the move of the battery unit 5 relative to the vehicle body 9 is absorbed. Therefore, the battery unit holding device of the present embodiment suppresses damages incurred by the battery unit 5, while holding the battery unit in place in the lower part of the vehicle body 9, in the event of an impact being applied to the vehicle body 9 in the longitudinal direction thereof.

Third Embodiment

Figure 18:
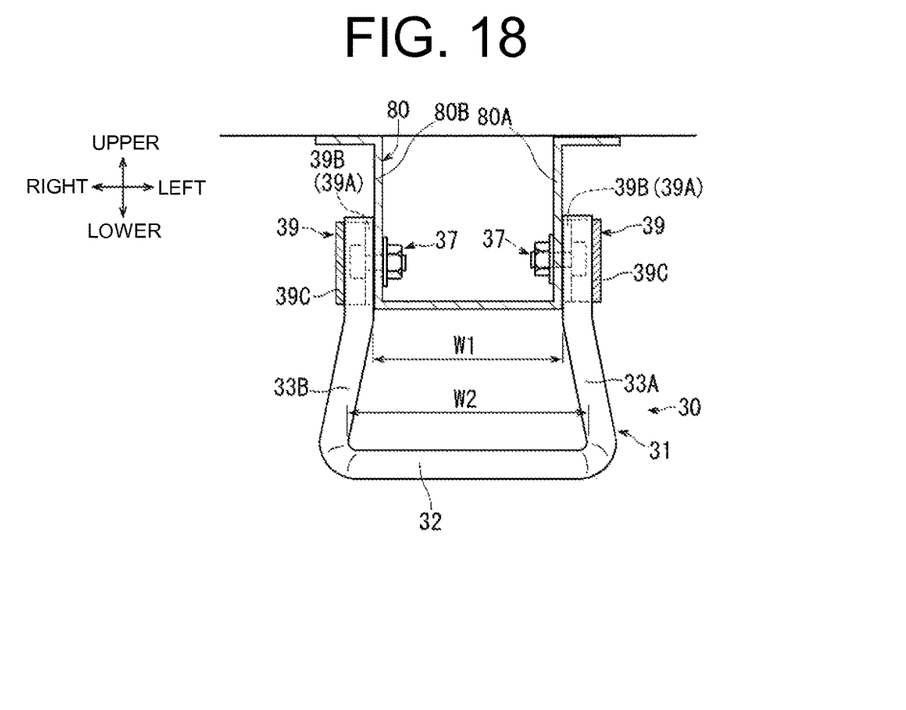
FIG. 18 is a fragmentary cross-sectional view taken along line I-I in FIG. 1 similar to FIG. 5, showing the striker device of a battery unit holding device for a vehicle of a third embodiment according to the present invention.

The following will describe the battery unit holding device according to the third embodiment of the present invention with reference to FIG. 18. The third embodiment differs from the first embodiment in that the striker 31 of the striker device 30 has been modified to have a shape as shown in FIG. 18.

The battery unit holding device according to the third embodiment will be described more specifically. The dimension of the side member 80 to which the base plates 39 are fixed, as measured in the width direction of the vehicle, is indicated by W1. W2 represents the width dimension between the projecting parts 33A, 33B of the striker 31, as measured at a position shown in FIG. 18 that is more distant from the base plate 39 than the position for the width dimension W1. As apparent from the drawing, the dimension W2 is greater than the width dimension W1. The rest of the configuration of the battery unit holding device of the third embodiment is substantially the same as that of the first embodiment.

The battery unit holding device of the third embodiment also exhibits substantially the same effects as the battery unit holding device 1 of the first embodiment.

Furthermore, the battery unit holding device according to the third embodiment makes it possible for the support shaft 32 to have a length that is greater as compared with the first and second embodiments without being restricted by the width dimension W1 of the side member 80 to which the base plates 39 are fixed. Therefore, the distance for which the lock device 10 is movable along the support shaft 32 of the striker device 30 is increased, with the result that the movement of the battery unit 5 relative to the vehicle body 9 is absorbed with sureness.

Although the present invention has been described in the context of the first to third embodiments, the present invention is not limited to such embodiments, but may appropriately be modified within the scope of the invention.

The present invention is applicable to a vehicle such as an automobile and an industrial vehicle.

What is claimed is:

1. A battery unit holding device for a vehicle that holds a battery unit in place in the lower part of a body of the vehicle, comprising:
    a fixing part that is provided in one of the vehicle body and the battery unit;
    a fixed part that is provided in the other of the vehicle body and the battery unit and to be fixed on the fixing part; and
    a positioning part that is to be provided between the vehicle body and the battery unit for positioning the battery unit to the vehicle body, wherein
    the fixed part includes a support shaft that extends in a first direction that corresponds to one of a longitudinal direction and a width direction of the vehicle body for supporting load acting downwardly on the battery unit;
    the fixing part is movable in the first direction along the support shaft while holding the support shaft at a middle position of the support shaft;
    the positioning part is configured to permit the fixing part to move in the first direction along the support shaft from the middle position of the support shaft when a first impact that is greater than a first preset force is applied to the vehicle body in the first direction, wherein the positioning part includes:
        a first bracket having a U-shaped cross section as viewed in the first direction that is fixed on the vehicle body and extended away from the vehicle body and a second bracket having a U-shaped cross section as viewed in the first direction that is fixed on the battery unit and extended away from the battery unit;
        a positioning pin that is fixed to one of the vehicle body and the battery unit;
        a first positioning hole formed in the first bracket through which the positioning pin is configured to be inserted so that a middle part of the positioning pin is secured into the first positioning hole without free play; and
        a second positioning hole formed in the second bracket through which the positioning pin is to be inserted; and wherein
    the positioning part is configured such that, when the first impact is applied to the vehicle body in the first direction, the first bracket moves with respect to the second bracket in the first direction and the first positioning hole deforms into an elongated hole that is elongated in the first direction and at least one of the first positioning hole, the second positioning hole, and the positioning pin is deformed or broken.

2. The battery unit holding device according to claim 1, wherein
    the fixed part is a striker device including a base plate to be fixed on one of the vehicle body and the battery unit and a striker that extends from the base plate and part of which is the support shaft; and
    the fixing part is a lock device including a housing, a latch and a pawl, the housing having an insertion hole that permits the support shaft to be inserted therein, the latch being swingably supported in the housing and switchable between an engaging state in which the latch engages with the support shaft in the housing and a release state in which the latch releases the support shaft in the housing, and the pawl being configured to fix the latch.

3. The battery unit holding device according to claim 2, wherein
    the striker includes a pair of projecting parts extending from the base plate and the support shaft through which the projecting parts are connected to each other at ends thereof; and
    a dimension between the projecting parts in the first direction is greater as measured at a position that is more distant from the base plate.

4. A battery unit holding device for a vehicle that holds a battery unit in place in the lower part of a body of the vehicle, comprising:
    a fixing part that is provided in one of the vehicle body and the battery unit;
    a fixed part that is provided in the other of the vehicle body and the battery unit to be fixed on the fixing part; and
    a positioning part that is to be provided between the vehicle body and the battery unit for positioning the battery unit to the vehicle body, wherein
    the fixed part includes a support shaft that extends in a first direction that corresponds to one of a longitudinal direction and a width direction of the vehicle body for supporting load acting downwardly on the battery unit;
    the fixing part is movable in the first direction along the support shaft while holding the support shaft at a middle position of the support shaft; and
    the positioning part is configured to permit the fixing part to move in the first direction along the support shaft from the middle position of the support shaft when a first impact that is greater than a first preset force is applied to the vehicle body in the first direction, wherein the fixed part is a striker device including a base plate to be fixed on one of the vehicle body and the battery unit and a striker that extends from the base plate and part of which is the support shaft; and the fixing part is a lock device including a housing, a latch and a pawl, the housing having an insertion hole that permits the support shaft to be inserted therein, the latch being swingably supported in the housing and switchable between an engaging state in which the latch engages with the support shaft in the housing and a release state in which the latch releases the support shaft in the housing, and the pawl being configured to fix the latch, wherein the striker is supported by the base plate swingably about an axis that is substantially parallel to the first direction; and the positioning part is configured to permit the striker to swing about the axis when a second impact that is greater than a second preset force is applied to the vehicle body in a second direction that corresponds to the other of the longitudinal direction and the width direction of the vehicle.

* * * * *